United States Patent

Kirshenbaum et al.

(10) Patent No.: US 9,047,290 B1
(45) Date of Patent: Jun. 2, 2015

(54) COMPUTING A QUANTIFICATION MEASURE ASSOCIATED WITH CASES IN A CATEGORY

(75) Inventors: Evan R. Kirshenbaum, Mountain View, CA (US); Henri J. Suermondt, Sunnyvale, CA (US); George H. Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1759 days.

(21) Appl. No.: 11/118,786

(22) Filed: Apr. 29, 2005

(51) Int. Cl.
- *G06F 7/00* (2006.01)
- *G06F 17/00* (2006.01)
- *G06F 17/30* (2006.01)
- *G06F 13/14* (2006.01)

(52) U.S. Cl.
CPC ............................... *G06F 17/30067* (2013.01)

(58) Field of Classification Search
CPC .............. G06F 17/30705; G06F 15/18; G06F 17/30707; G06F 17/30867
USPC ........... 715/500, 719; 707/1, 5, 6, 102, 2, 1/1, 707/3, 100, 101, 651, 710, 737, E17.09, 707/E17.89, 705, 723, 740, 748, 999.003; 382/109, 173, 228, 190, 159, 155, 224; 706/12, 20; 705/7.32
See application file for complete search history.

(56) References Cited

U.S. PATENT DOCUMENTS

| | | | |
|---|---|---|---|
| 5,805,730 A | 9/1998 | Yaeger | |
| 5,819,258 A | 10/1998 | Vaithyanathan et al. | |
| 5,872,865 A | 2/1999 | Normile | |
| 5,903,884 A | 5/1999 | Lyon et al. | |
| 5,943,670 A * | 8/1999 | Prager | 707/5 |
| 6,003,027 A | 12/1999 | Prager | |
| 6,038,560 A * | 3/2000 | Wical | 707/5 |
| 6,161,130 A | 12/2000 | Horvitz | |
| 6,182,066 B1 | 1/2001 | Marques | |
| 6,192,360 B1 | 2/2001 | Dumals | |
| 6,253,169 B1 | 6/2001 | Apte | |
| 6,343,275 B1 | 1/2002 | Wong | |
| 6,418,434 B1 | 7/2002 | Johnson et al. | |
| 6,446,061 B1 | 9/2002 | Doerre | |
| 6,675,161 B1 | 1/2004 | Suchter | |
| 6,701,333 B2 | 3/2004 | Suermondt et al. | |
| 6,704,905 B2 * | 3/2004 | Fukushige et al. | 715/234 |

(Continued)

FOREIGN PATENT DOCUMENTS

EP  0747846 A2  12/1996

OTHER PUBLICATIONS

Forman et al., U.S. Appl. No. 11/080,098, entitled "A Method of, and System for, Classification Count Adjustment," filed Mar. 14, 2005, pp. 1-31, Figs. 1A-5.

(Continued)

*Primary Examiner* — Usmaan Saeed
*Assistant Examiner* — Cecile Vo
(74) *Attorney, Agent, or Firm* — Trop, Pruner & Hu, P.C.

(57) ABSTRACT

At least one case from a set of cases is identified in response to a query relating to at least one category. An indication is received regarding whether the at least one case belongs to the category. A categorizer is trained based on the received indication. A quantification measure associated with cases in the category is computed based on output from the categorizer.

24 Claims, 4 Drawing Sheets

(56) References Cited

U.S. PATENT DOCUMENTS

| | | | |
|---|---|---|---|
| 6,727,914 B1 | 4/2004 | Gutta | |
| 6,728,690 B1 | 4/2004 | Meek et al. | |
| 6,751,600 B1 | 6/2004 | Wolin | |
| 6,778,704 B1 | 8/2004 | Kawatani | |
| 6,823,323 B2 | 11/2004 | Forman et al. | |
| 6,839,680 B1 | 1/2005 | Liu | |
| 6,842,751 B1* | 1/2005 | Vilalta et al. | 707/6 |
| 6,944,616 B2* | 9/2005 | Ferguson et al. | 707/10 |
| 6,973,452 B2 | 12/2005 | Metzger et al. | |
| 7,043,492 B1* | 5/2006 | Neal et al. | 707/101 |
| 7,113,957 B1 | 9/2006 | Cohen et al. | |
| 7,133,834 B1 | 11/2006 | Abelow | |
| 7,177,855 B2 | 2/2007 | Witkowski et al. | |
| 7,184,602 B2 | 2/2007 | Cohen et al. | |
| 7,200,606 B2* | 4/2007 | Elkan | 1/1 |
| 7,263,530 B2* | 8/2007 | Hu et al. | 1/1 |
| 7,325,005 B2 | 1/2008 | Forman et al. | |
| 7,415,136 B2 | 8/2008 | Gallagher | |
| 7,437,338 B1 | 10/2008 | Forman | |
| 7,472,095 B2 | 12/2008 | Huelsbergen | |
| 7,593,904 B1 | 9/2009 | Kirshenbaum | |
| 7,668,789 B1 | 2/2010 | Forman | |
| 2002/0016798 A1 | 2/2002 | Sakai | |
| 2002/0107712 A1 | 8/2002 | Lam et al. | |
| 2002/0184524 A1 | 12/2002 | Steele | |
| 2003/0046098 A1 | 3/2003 | Kim | |
| 2003/0088639 A1 | 5/2003 | Lentini | |
| 2003/0187809 A1 | 10/2003 | Suermondt et al. | |
| 2004/0064464 A1* | 4/2004 | Forman et al. | 707/100 |
| 2004/0139059 A1 | 7/2004 | Conroy | |
| 2005/0015273 A1 | 1/2005 | Iyer | |
| 2005/0060643 A1 | 3/2005 | Glass | |
| 2005/0096866 A1 | 5/2005 | Shan et al. | |
| 2005/0114229 A1 | 5/2005 | Ackley | |
| 2005/0126505 A1 | 6/2005 | Gallagher | |
| 2005/0240572 A1 | 10/2005 | Sung | |
| 2006/0089924 A1 | 4/2006 | Raskutti | |
| 2006/0111928 A1 | 5/2006 | Fisher | |
| 2006/0116994 A1 | 6/2006 | Jonker | |
| 2006/0161423 A1 | 7/2006 | Scott | |
| 2006/0173559 A1 | 8/2006 | Kirshenbaum et al. | |
| 2006/0248054 A1* | 11/2006 | Kirshenbaum et al. | 707/3 |
| 2007/0156677 A1 | 7/2007 | Szabo | |
| 2007/0185901 A1* | 8/2007 | Gates | 707/102 |
| 2008/0046273 A1 | 2/2008 | Tenorio | |
| 2008/0097822 A1 | 4/2008 | Schigel | |

OTHER PUBLICATIONS

Kirshenbaum et al., U.S. Appl. No. 11/172,187, entitled "Effecting Action to Address an Issue Associated with a Category Based on Information that Enables Ranking of Categories," filed Jun. 30, 2005, pp. 1-52, Figs. 1-5H.

Kirshenbaum et al., U.S. Appl. No. 11/211,979, entitled "Producing a Measure Regarding Cases Associated with an Issue After One or More Events Have Occurred," filed Aug. 25, 2005, pp. 1-51, Figs. 1-5H.

Forman et al., U.S. Appl. No. 11/364,108, entitled "Identifying an Emerging or New Category," filed Feb. 28, 2006, pp. 1-34, Figs. 1-6.

Forman et al., U.S. Appl. No. 11/393,487, entitled "Comparing Distributions of Cases Over Groups of Categories," filed Mar. 30, 2006, pp. 1-39, Figs. 1-7E.

Office Action dated Oct. 16, 2007 in U.S. Appl. No. 11/118,178.

Shan, U.S. Appl. No. 11/117,989, entitled "Performing Quality Determination of Data," filed Apr. 29, 2005, pp. 1-32, Figs. 1-9.

Shan, U.S. Appl. No. 11/118,832, entitled "Determining a Time Point Corresponding to a Change in Data Values Based on Fitting with Respect to Plural Aggregate Value Sets," filed Apr. 29, 2005, pp. 1-26, Figs. 1-8.

Shan, U.S. Appl. No. 11/119,037, entitled "Detecting Change in Data," filed Apr. 29, 2005, pp. 1-26, Figs. 1-6.

Forman et al., U.S. Appl. No. 11/386,005, entitled "Providing Information Regarding a Trend Based on Output of a Categorizer," filed Mar. 21, 2006, pp. 1-44, Fig. 1-5G.

Office Action dated Jan. 17, 2008 in U.S. Appl. No. 11/386,005.

Office Action dated Jun. 2, 2008 from U.S. Appl. No. 11/118,178.

U.S. Appl. No. 11/364,108, Final Rejection dated Dec. 22, 2011, pp. 1-33 and attachment.

"Classification of Text Documents", by Y. H. Lin et al., Department of Computer Science and Engineering, Michigan State University, E. Lansing, Michigan, The Computer Journal, vol. 41, No. 8, 1998 (10 pages).

"A Conceptual Model for Managing Information in Electronic Mail", by Juha Takkinen et al., Laboratory for Intelligent Information Systems, Department of Computer and Information Science, Linkoping University, Sweden, Conference on System Sciences,1998 (10 pages).

U.S. Appl. No. 11/118,178, Examiner's Answer dated Feb. 22, 2010 (51 pages).

U.S. Appl. No. 11/211,979, Examiner's Answer dated Apr. 27, 2011 (24 pages).

U.S. Appl. No. 11/211,979, Final Rejection dated Sep. 10, 2010, pp. 1-19 and attachments.

U.S. Appl. No. 11/211,979, Non-Final Rejection dated Mar. 19, 2010, pp. 1-18 and attachments.

U.S. Appl. No. 11/211,979, Non-Final Rejection dated Aug. 28, 2009, pp. 1-19 and attachments.

U.S. Appl. No. 11/364,108, Non-Final Rejection dated Jul. 22, 2011, pp. 1-27 and attachments.

U.S. Appl. No. 11/364,108, Final Rejection dated Oct. 22, 2010, pp. 1-25 and attachments.

U.S. Appl. No. 11/364,108, Non-Final Rejection dated Apr. 14, 2010, pp. 1-20 and attachments.

"A Conceptual Model for Managing Information in Electronic Mail", by Juha Takkinen et al., Laboratory for Intelligent Information Systems, Department of Computer and Information Science, Linkoping University, Sweden, Conference on System Sciences, 1998 (10 pages).

"Detecting Emerging Concepts in Textual Data Mining", by William Pottenger and Ting-hao Yang, Department of Electrical Engineering and Computer Science, Lehigh University, Bethlehem, PA 18015, Apr. 23, 2001 (17 pages).

"Computer-Assisted Categorization of Patent Documents in the International Patent Classification", by C. J. Fall et al., Proceedings of the International Chemical Information Conference, Nimes, Oct. 2003 (14 pages).

Xiaogang Peng, M.S., "Sense-Based Text Classification by Semantic Hierarchy Representation," College of Engineering and Science, Louisiana Tech University, Nov. 2004 (92 pages).

U.S. Appl. No. 11/118,178, Final Rejection dated Dec. 12, 2008, pp. 1-23 and attachments.

U.S. Appl. No. 11/172,187, Office Action dated Dec. 8, 2008, pp. 2-9 and attachments.

U.S. Appl. No. 11/118,178, Decision on Appeal, dated Apr. 2, 2013 (12 pages).

U.S. Appl. No. 11/118,178, Non-Final Rejection mailed Jan. 9, 2014, pp. 1-23 and attachments.

U.S. Appl. No. 11/118,178, Non-Final Rejection mailed Jul. 30, 2013, pp. 1-34 and attachments.

U.S. Appl. No. 11/118,178, Final Rejection dated Jun. 16, 2014, pp. 1-25 and attachments.

* cited by examiner

COMPUTING A QUANTIFICATION MEASURE ASSOCIATED WITH CASES IN A CATEGORY

BACKGROUND

In data mining applications, it is often useful to identify categories to which data items within a database (or multiple databases) belong. Once the categories are identified, some type of quantification measure regarding data items in the various categories can be generated. Such quantification measure may be a simple count of data items or it may be the sum (or some other statistic) of some value associated with each data item. Conventional techniques for computing quantification measures associated with data items in one or more categories are not very accurate or efficient.

Often, the quantification is performed manually. In one example context, quantification is based on categorizations performed by customer support representatives when taking customer calls (where each call represents a data item or case that has to be categorized). However, manual categorizations and quantifications such as those performed by customer representatives or other personnel are usually inaccurate because the personnel are often not properly trained or incented to categorize data items correctly. Also, there may not be a complete list of categories available to such personnel, which often leads to mis-categorization of data items.

In some cases, quantification is based on a sample of cases in a data set, rather than an entire data set. It is assumed that the computed quantities in each category based on the sample apply proportionately to the remainder of the data set. However, such an assumption usually does not apply to other data sets, such as data sets for the next time period (e.g., next month, next year, etc.). Therefore, for each periodic data set, a new round of manual identification and quantification is performed, leading to further expense.

In some other cases, quantification may be based on outputs of automated categorizers. However, it is often difficult and expensive to develop, train, and maintain accurate conventional categorizers, especially when cases need to be categorized into one or more of a large set of categories.

Also, the computation of quantification measures may suffer from inaccurate identification of categories, which are often initially unknown or not very well known. There are typically two types of techniques to identify useful categories: manual techniques and automated techniques. If performed manually, categories are usually identified based on the experience or "gut feelings" of experts. The experts can look at a sample of data items and, based on this examination, identify the categories (e.g., problems associated with a product or products of a company). This type of manual identification of categories is relatively time consuming.

In other cases, there may be industry standard sets of categories that are useable to provide an initial set of categories. Alternatively, people (such as customers) can be asked to fill out surveys to enable identification of categories. However, the information that can be gathered from customers in a survey is usually limited, and customers often provide incomplete or inaccurate information.

Generally, manual identification of categories as conventionally done is often inaccurate and can be costly. Moreover, the list of categories that are manually created may be incomplete such that data items may be forced into a category that the data items do not really belong to.

Automated techniques of category identification often use a clustering process. Clustering is often inaccurate, as clustering algorithms tend to place every data item of a database into some cluster or other, even though some of the data items may not belong to the clusters. Also, clustering algorithms tend to place each data item into a single cluster, even though some data items may belong to multiple clusters. Also, the number of clusters usually must be specified ahead of time rather than discovered based on the content of the data items. Also, if multiple data sets are examined and clustering performed on each, usually there is no consistency between the clusters and thus no accurate mechanism is provided to compare the categories of different data sets. Also, clustering algorithms usually do not assign a meaningful semantic label to an automatically-discovered cluster.

Thus, quantification of data items in one or more categories is associated with at least two issues: (1) conventional quantification techniques are generally inaccurate and/or inefficient; and (2) computed quantification measures may not be very meaningful or accurate due to inaccurate identification of categories.

BRIEF DESCRIPTION OF THE DRAWINGS

Some embodiments of the invention are described with reference to the following figures.

DETAILED DESCRIPTION

Figure 1:
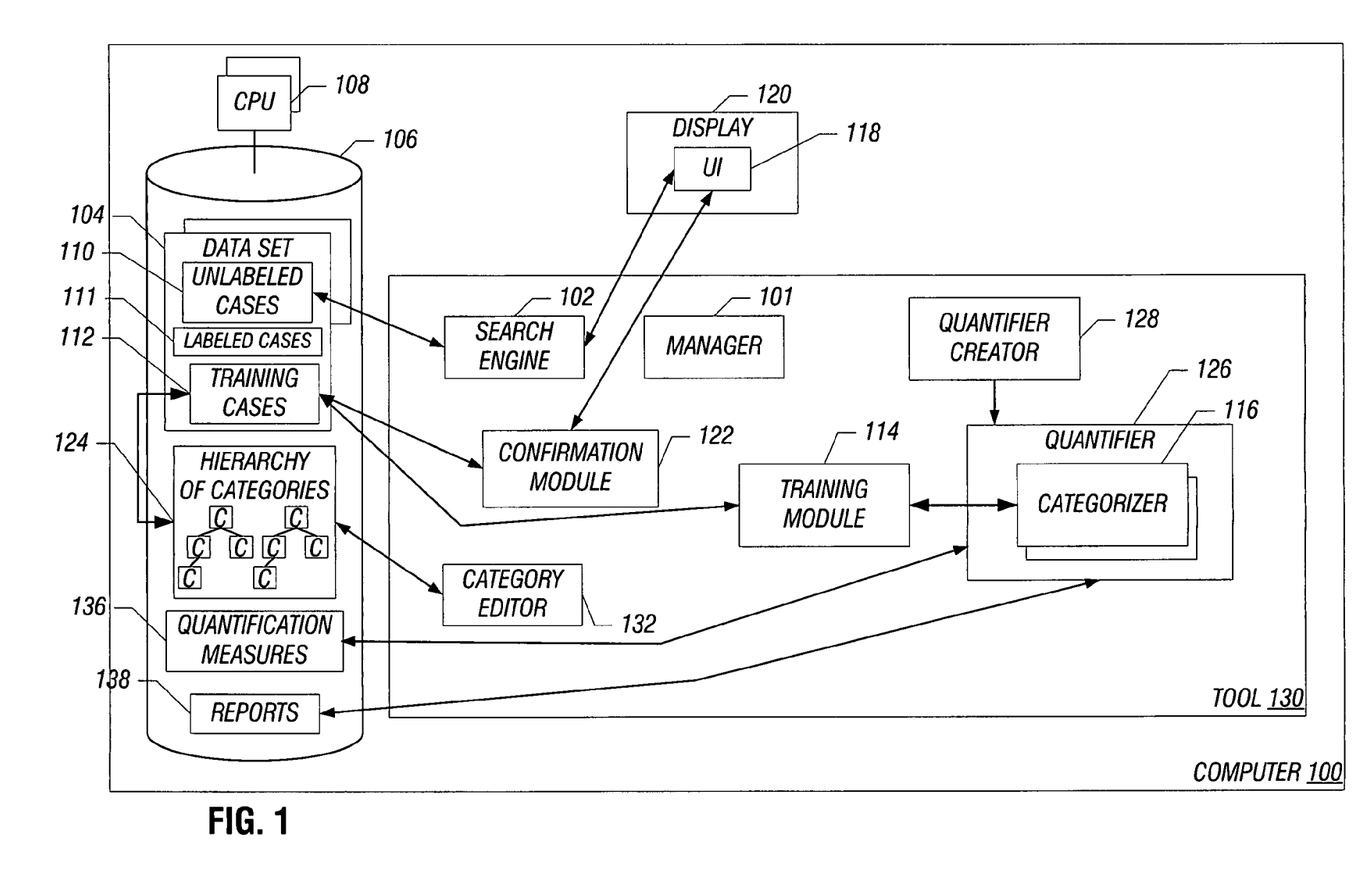
FIG. 1 is a block diagram of a computer that incorporates a tool according to an embodiment of the invention.

FIG. 1 illustrates a computer 100 that contains a tool 130 (e.g., a software tool) containing various modules according to some embodiments of the invention that are executable in the computer 100. The tool 130 provides an efficient and relatively easy-to-use mechanism for identifying categories that may be of interest to a user or an organization (e.g., business organization, educational organization, governmental organization). Once categories have been identified, the tool 130 also includes a quantifier 126 for efficiently and accurately performing quantification of cases with respect to one or plural categories present in a hierarchy 124 of categories stored in a storage 106. "Quantification" refers to the computation of one or more of the following measures: (1) a quantity of cases in each category; and (2) an aggregate (e.g., sum, average, maximum, minimum, etc.) of a data field associated with each of the cases in the respective category. A "case" refers to a data item that represents a thing, event, or some other item. Each case is associated with predefined information (e.g., product description, summary of problem, time of event, and so forth).

Knowing a quantification measure, or an estimate of a quantification measure, with respect to cases of one or more categories enables an understanding of relative magnitudes of various categories. This understanding allows for an ordering of categories such that a user or organization can focus on higher priority issues associated with the categories.

The quantification measures 136 produced by the quantifier 126 can be used in any number of ways, such as in textual or graphical outputs to enable comparison of quantification measures in different time periods, for different products, in different geographic regions, and so forth.

The quantifier 126 is used in cooperation with other modules of the tool 130, including modules forming a search-and-confirm mechanism for performing a search-and-confirm procedure to develop training information (in the form of training cases 112 according to some embodiments) to be used for training a categorizer (or plural categorizers) 116. Training a categorizer refers to building or modifying a categorizer based on the training cases.

In accordance with some embodiments, concurrently with the search-and-confirm procedure for the purpose of developing categorizer training information, new categories can be discovered or existing categories modified. As new categories are added or existing categories modified, training cases (in the form of positive and negative training sets of cases) are further developed for these new or modified categories to further train the categorizer(s) 116. The one or plural trained categorizers 116 are then used to categorize or classify cases of one or plural data sets 104 into one or more categories. As the one or plural categorizers 116 categorize or classify cases, quantification of cases in the one or more categories is performed by the quantifier 126.

The tool 130 effectively provides an interactive package useable by a user to efficiently and accurately identify categories, train a categorizer, categorize cases, and produce quantification measure(s) for the categorized cases. The tool 130 enables the category identification, categorizer training, case categorization, and quantification processes to be performed generally in a concurrent manner for enhanced efficiency. Also, the tool 130 simplifies the processes of identifying new categories for unlabeled cases 110 and labeled cases 111 in the data set 104; developing training cases for training the categorizer; training the categorizer; categorizing cases; and quantifying the categorized cases. Labeled cases refer to cases that have been labeled with respect to one or more categories, whereas unlabeled cases refer to cases that have not been labeled.

Although the various modules depicted in FIG. 1 are part of one tool 130, it is contemplated that the modules can be implemented in multiple tools that are deployable in the computer 100 or in multiple computers in other implementations.

The identification of categories is performed by a user of the tool 130 as the user uses the search-and-confirm mechanism of the tool. The search-and-confirm mechanism includes the search engine 102 and confirmation module 122. The search engine 102 enables a user to submit a search and to display a list of cases matching the search criterion or criteria. With the confirmation module 122, the user is able to confirm or disconfirm whether each of the displayed cases belongs to a category (or plural categories). The search engine 102 and confirmation module 122 cooperate to determine training cases 112 (positive and negative training sets) from unlabeled cases 110 and labeled cases 111 in a data set 104 (based on user confirmation and disconfirmation), which training cases 112 are used by the training module 114 to train the categorizer(s) 116.

The search engine 102 receives a query from a user through the user interface 118, and issues the query to identify cases from among the cases in the data set(s) 104. The search engine 102 displays information regarding identified cases that match the query. A case is said to "match" a query if any information associated with the case satisfies some criterion, such as search term, in the query. The displayed information regarding the identified cases is presented in the user interface 118. The user interface 118 can be a graphical user interface, according to an example implementation.

The information displayed in the user interface 118 by the search engine 102 in response to the query includes information regarding a subset of the cases that match search criterion (ia) (in the form of search terms) in the query. A "term" specified by a query refers to any string, substring, regular expression, glob expression, non-textual object (e.g., audio object, video object, etc.), or any other term. A "glob expression" is an expression containing an operator indicating presence of zero or more characters (e.g., *), an arbitrary character (e.g., ?), a range of characters, or a range of strings. A case matches a search term in the query if any information associated with the case satisfies the search term in any specified manner (in other words, equality between the case information and the search term is not required, since the query can specify other forms of relationships between the case information and search term). Not all cases that match need to be used. The user interface 118 displays a summary of each of the matching cases to provide a user with information regarding each case. The process of specifying a query and viewing results of matching cases is referred to as a "scooping" process. Following the scooping process, a "confirming" process is performed in which a user is able to confirm whether or not each of the matching cases belongs to a particular category (by selecting or deselecting displayed fields or other indicators).

User confirmation (or disconfirmation) is monitored by the confirmation module 122. For cases that have been correctly matched to a category, such cases are added to a positive training set of cases. On the other hand, for cases that have been incorrectly matched, the confirmation module 122 adds such incorrectly matched cases to a negative training set of cases. The negative training set and the positive training set, which are part of the training cases 112 stored in the data set 104, are accessed by the training module 114 for training the categorizer 116. Not all displayed cases need to be confirmed or disconfirmed.

During the searching and confirming, a user can determine that additional categories should be added to a hierarchy 124 of categories, or existing categories in the hierarchy 124 modified. Using a category editor 132 in the tool 130, the user can move, add, modify, or even delete categories (represented by the hierarchy 124 of categories stored in a storage 106). In the example hierarchy 124 depicted in FIG. 2, each box designated "C" represents a category. As depicted, a category can have subcategories, which also can have subcategories. As categories are added, deleted, or modified, additional training cases can be developed for each category, with the training module 114 training the categorizer 116 based on these additional training cases. Adding, deleting, or modifying categories (or subcategories) causes the positive and negative training sets of the training cases 112 to be modified. In this manner, identification of categories, based on information derived from the search-and-confirm procedure, can be accomplished in an efficient manner. Also, identification of new categories (or subcategories) using such a technique is more accurate than typical conventional techniques of identifying categories.

The category editor 132 is responsive to user input at a user interface (UI) 118 (presented in a display monitor 120) to add categories (or subcategories), delete categories (or subcategories), or modify categories (or subcategories). In response to user input to add, delete, or modify categories (or subcategories), the category editor 132 is able to modify the hierarchy 124 of categories. In some embodiments, the category editor 132 may be omitted, and the search-and-confirm procedure may take place with respect to a predefined set of categories.

Note that, initially, there may already be a developed set of categories before the search-and-confirm procedure is started, which existing set of categories can be used as a starting or initial set of categories. In an alternative scenario, such as with a new project, no categories may exist. In this alternative scenario, the user may create one or a few categories as the starting point, or the one or few categories can be created by another technique, described further below.

In one embodiment, the categories in the hierarchy 124 of categories are in a directed acyclic graph (DAG) rather than a tree. In other words, any category in the hierarchy 124 can have not only several children, but also several parents. However, a category cannot be simultaneously an ancestor and a descendant of another category. Subcategories (associated with a particular category) are considered the children of the particular category. In alternative implementations, other structural relationships of categories can be employed.

The data set(s) 104, training cases 112, and hierarchy 124 of categories are stored in the storage 106, which can be persistent storage (such as magnetic or optical disk drives or non-volatile semiconductor memory devices), volatile memory (such as dynamic random access memories or static random access memories), or other types of storage devices. The storage 106 is connected to one or plural central processing units (CPUs) 108. Alternatively, the data set(s) 104 can be remotely located, such as in a remote database system.

A feature of some embodiments of the invention is that development of the training cases 112 by the search engine 102 and confirmation module 122 can occur generally concurrently with training of the categorizer(s) based on the developed (or developing) training cases 112. For example, the training of the categorizer(s) 116 can occur in the background, in some implementations, as the user interacts with the search engine 102 and confirmation module 122 to generate training cases.

A manager module 101 in the tool 130 performs overall management operations, such as managing the storing of data (including training cases 112 and hierarchy 124 of categories) in the storage 106 and coordination among the various modules of the tool 130. As the positive and negative training sets are modified based on the user confirming and disconfirming acts, and based on modification of the hierarchy 124 of categories, the modified positive and negative training sets are propagated through the hierarchy 124 of categories to enable the training module 114 to train the categorizer 116 for the categories.

During development of the categorizer(s) 116, the quantifier 126 is also created by a quantifier creator module 128 in the tool 130. The quantifier 126 can be in any format, such as an Extensible Markup Language (XML) format, C code format, or any other format. In the arrangement of FIG. 1, the categorizer(s) 116 are part of the quantifier 126. However, in other embodiments, the quantifier 126 cooperates with the categorizer(s) 116 to perform automated quantification of the cases. Such cooperation may include making requests of (or otherwise interacting with) the categorizer(s) 116 running on computer 100 or on other computers or it may include using the result of prior executions of the categorizer(s) 116. In this manner, manual quantification (which can be time intensive, inaccurate, and expensive) is replaced with quantification by the quantifier 126 using categorizer(s) 116 trained according to some embodiments of the invention.

The quantification performed by the quantifier 126 includes computing, for one or more of the categories in the hierarchy 124 of categories, a quantification measure that represents the number of cases in each category. Alternatively, the quantifier 126 is able to generate another quantification measure, such as a sum or some other aggregate of a data field associated with the cases that belong to each category. As an example, the quantification can sum the duration of calls, cost of repair, amount of time to resolve the calls, amount of lost revenue, and so forth. Other examples of aggregation include an average or mean, a standard deviation, a 95% (or other percentage level) confidence interval, a variance, a minimum, a maximum, a median, a mode, a geometric mean, a harmonic mean, a percentile rank, an ordinal statistic, or other statistic of the values in the data field associated with the cases or a value computed based on fitting a model to the values in the data field associated with the cases. The data field of a case can contain a single value or a collection of values, or the data field can be a value or collection of values computed from other values associated with the case. In some embodiments the aggregate may involve a plurality of data fields associated with each case. The quantification measures computed by the quantifier 126 are stored as quantification measures 136 in the storage 106.

Note that the quantification measures computed by the quantifier 126 are estimated measures in light of the fact that the categorization performed by the categorizer 116 is not absolutely accurate. For example, the accuracy of a trained categorizer can be impacted by the quality of training cases used to train the categorizer. As explained further below, to compensate for inaccuracies of the categorizer 116, calibration (or adjustment) of the quantifier 126 is performed based on some indication of the ability of the categorizer 116 to categorize cases in a data set. In any event, using the search-and-confirm procedure according to some embodiments, the training cases developed for training the categorizer 116 are generally more accurate than conventional techniques such that the categorizer 116 provides more accurate categorization of cases into categories. Consequently, the quantifier 126 is also able to more accurate produce quantification measures.

The quantifier 126 is able to display the quantification measures it computes either numerically, textually, or graphically. Also, the quantifier 126 is able to generate one or more reports 138 that present these quantifications. The reports 138 optionally also provide comparative quantifications, such as providing a comparison of cases in different data sets or in different partitions of one data set. The reports can optionally include additional descriptive information about the data set 104, for example the source, the product line or product type, or the time period. The reports can optionally include supplemental information, for example the number of items of the product line that were sold or that were under warranty during the time periods covered by the reports.

In some embodiments, the quantifier 126 trained using one data set 104 can be applied to other data sets in the same or another session. This allows the same quantifier to be applied to new data that arrives daily, weekly, monthly, annually, and so forth. As additional sets of cases are received, quantification measures associated with the additional sets of cases are computed. The receiving and computing are repeated at plural intervals. As examples, the intervals can be less than a year, a month, a week, a day, an hour, or a second.

Moreover, in some embodiments, the tool 130 can provide the quantifier 126, along with one or plural associated categorizer(s) 116, as an output. The output quantifier 126 and categorizer(s) 116 is useable on other data sets to perform categorization and quantification on the other data sets. By being able to re-run the quantifier 126 and categorizer(s) 116 on other data sets, no additional substantial manual labor is involved in applying the quantifier 126 to the other data sets. For example, using the output quantifier 126, the quantification analysis can be easily repeated daily, weekly, monthly, annually, and so forth. In some embodiments an output quantifier may be implemented differently (e.g., based on different underlying categorization or calibration algorithms) from the quantifier 126 within the tool 130.

Figure 2:
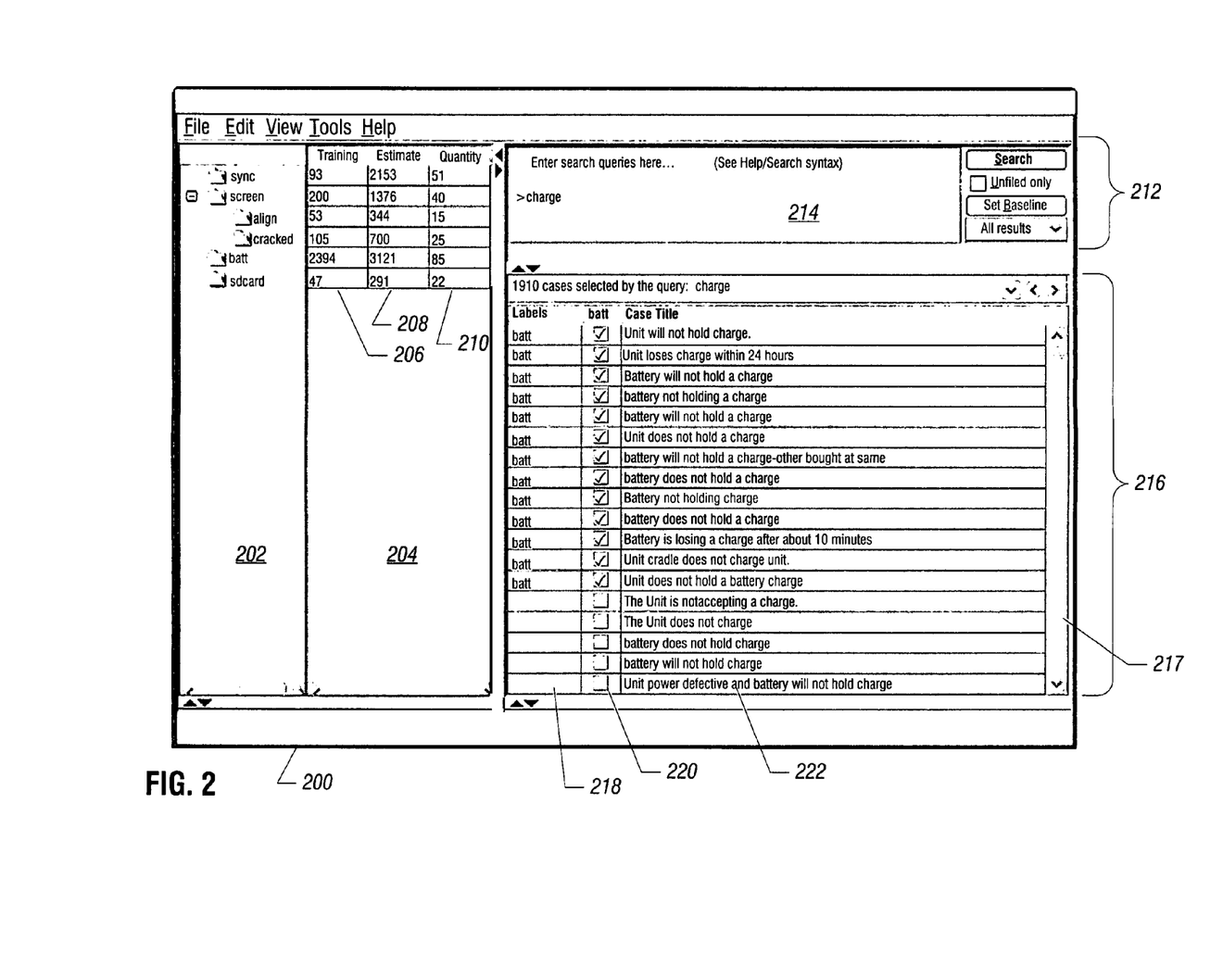
FIG. 2 illustrates a user interface for presenting information associated with the tool according to an embodiment.

FIG. 2 illustrates an example of a GUI screen 200 that can be displayed in the user interface 118 (FIG. 1), according to some embodiments. The content of the GUI screen 200 is provided by one or more of the search engine 102, confirmation module 122, manager module 101, training module 114, category editor 132, categorizer 116, and quantifier 126.

The GUI screen 200 includes a first frame 202 that displays the hierarchy of categories (also referred to as "classmap") that is being built using the tool 130 of FIG. 1. In the example depicted in FIG. 2, the four main categories include "sync," "screen," "batt," and "sdcard." Note that any of these four categories can include subcategories. For example, the "screen" category has subcategories. Examples of subcategories of the "screen" category include the "cracked" subcategory, and the "align" subcategory. The subcategories can further include subcategories to any desired depth.

The GUI screen 200 also includes a second frame 204 with a "training" column 206 to display the number of cases that have been identified by a user (either directly or by inference) as being positive cases for a given category. The "Training" column 206 lists the number of cases for each of the "sync," "screen," "batt," and "sdcard" categories. For example, in the "Training" column 206, the "sync" category has 93 cases, the "screen" category has 200 cases, the "batt" category has 2,394 cases, and the "sdcard" category has 47 cases.

Another column in the second frame 204 is an "Estimate" column 208, which displays the estimated number of cases identified by the quantifier 126 as belonging to each of the categories and subcategories. A third "Quantity" column 210 lists an estimated sum of some data field of the cases in each category, such as time spent on cases that belong in the category or cost of handling the cases in the category. The values in the "Quantity" column 210 are also provided by the quantifier 126.

Another optional column in the second frame 204 can indicate the perceived quality of the current categorizer with respect to each particular category (as determined by the status module 130 of FIG. 1).

Examples of information pertaining to the measure of the quality of the categorizer 116 that has been trained using training information developed according to some embodiments includes: true positive rate (the likelihood that an item in a category will be identified by the categorizer to be in the category); false negative rate (the likelihood that an item in a category will be identified by the categorizer to be not in the category); true negative rate (the likelihood that an item that is not in a category will be identified by the categorizer to be not in the category); false positive rate (the likelihood that an item that is not in a category will be identified by the categorizer to be in the category); accuracy (the likelihood that an item will be correctly identified to be or not to be in a category); recall (same as true positive rate); precision (the likelihood that an item identified to be in a category actually is in the category); bi-normal separation (a measure of the separation between the true positive rate and the false positive rate); information gain (a measure of the decrease in entropy due to the categorizer); lift (a measure of an increase in, e.g., response rate if only the cases the categorizer is most confident about are processed); stability under cross-validation (measure of the likelihood that the categorizer has or has not overfit the training information by learning to recognize individual cases rather than learning generalities that apply to unseen data); area under an ROC (receiver operating characteristic) curve (area under a curve that is a plot of true positive rate versus false positive rate for different threshold values for a categorizer); number of training cases; percentage of target training size (same as number of training cases, except with the added notion that a user has indicated a desire to see a minimum number of cases for every category); f-measure (a parameterized combination of precision and recall); total cost (an expected aggregate cost over analyzed cases considering separate individual costs for the true positives, true negatives, false positives, and false negatives); and average cost (similar to total cost, except averaged over the number of cases).

A search frame 212 is also displayed in the GUI screen 200. The search frame 212 includes a search area 214 in which a user can enter a query for performing the scooping process. As part of the scooping process, the user-provided query is submitted to the search engine 102 (FIG. 1) to retrieve a number of cases that will be displayed in a display frame 216. In the example shown in FIG. 2, the query contains the search term "charge," which means "find cases that contain the word 'charge.'"

The display frame 216 displays a summary (e.g., title) of some or each of the cases identified by the search based on the query entered in the search frame 212. Note that each case is associated with several pieces of information, with the title being one of the pieces, for example. In other implementations, other pieces of information associated with the cases can be displayed. In some embodiments, the user may separately select which pieces of information are to be displayed, to be used for matching queries, and to be used for training the categorizer. In the example of FIG. 2, the leftmost column 218 of the display frame 216 indicates the category (in text form) of each of the corresponding cases. In a second column 220 of the display frame 216, user-selectable boxes are provided to allow a user to confirm whether or not the corresponding cases belong to the category displayed, in this case, the "batt" category. The user-selectable boxes are clickable by a user to perform confirmation or disconfirmation. Also, the categorizer 116 can provide an initial guess as to whether or not the displayed cases belong to the category (by displaying a check mark or leaving the user-selectable box blank).

If the result cases do not fit in one page, a scroll bar 217 is provided to enable the user to scroll to the remaining cases. Alternatively, a user may specify that the GUI screen 200 displays a subset of randomly selected cases that fit within the display frame 216, such that the scroll bar 217 would not have to be used.

In the third column 222 of the display frame 216, a summary of the case, such as the case title, is illustrated. For example, the summary provided can have been previously entered by a customer support representative when answering customer calls. Even though the displayed summaries may contain mis-spellings, grammatical errors, and abbreviations, a user looking at each summary can quickly ascertain whether each respective case is associated with the category in question.

Note that each of the case titles displayed in the third column 222 of the display frame 216 contains the word "charge." Based on the displayed case title, a user can select or de-select each user-selectable box in the second column 220. In other implementations, other types of summaries can be displayed in the third column 222 to provide information that the user can use to select or de-select boxes in the second column 220. Selection of a box indicates that the user has confirmed that the particular case belongs to the category. On the other hand, when a user de-selects a box in the second column 220, that is an indication that the corresponding case does not belong to the category in question (that is, the user has disconfirmed that the case belongs to the category).

In a different embodiment, instead of displaying just one category, the display frame 216 can display multiple categories with fields that are user-selectable to confirm or disconfirm whether a case belongs to the categories. A confirmed case can be added to a positive set of training cases, while a disconfirmed case can be added to a negative set of training cases. The positive and negative sets of training cases are used to train the categorizer.

As a user labels cases as belonging (or not belonging) to particular categories based on input to the confirmation module 122, training cases 112 (positive and/or negative training cases), are added. As the training cases 112 are added, the categorizer 116 is trained concurrently. The training of the categorizer 116 as positive training cases or negative training cases are added can be performed in the background (in some embodiments) so that the training (or retraining) of the categorizer 116 does not interfere with the search and confirm processes used for identifying training cases. The trained categorizer is installed atomically once the training is complete. If the user makes changes to the categories while the categorizer is training, the training can be stopped and restarted with the modified categories. Note that the term "training" refers to either the first training of a categorizer or a retraining of the categorizer.

Also, as categories are added, modified, and/or deleted, the categories displayed in the first frame 202 are changed by the category editor 132 (FIG. 1). During the search, confirm, and training processes, the "Estimate" and "Quantity" columns 208 and 210 in the second frame 204 are also continually updated by the quantifier 126.

FIGS. 3A-3D show flow diagrams of processes that involve a search-and-confirm procedure, training procedure, and a quantifying procedure, according to an embodiment.

Figures 3A, 3B:
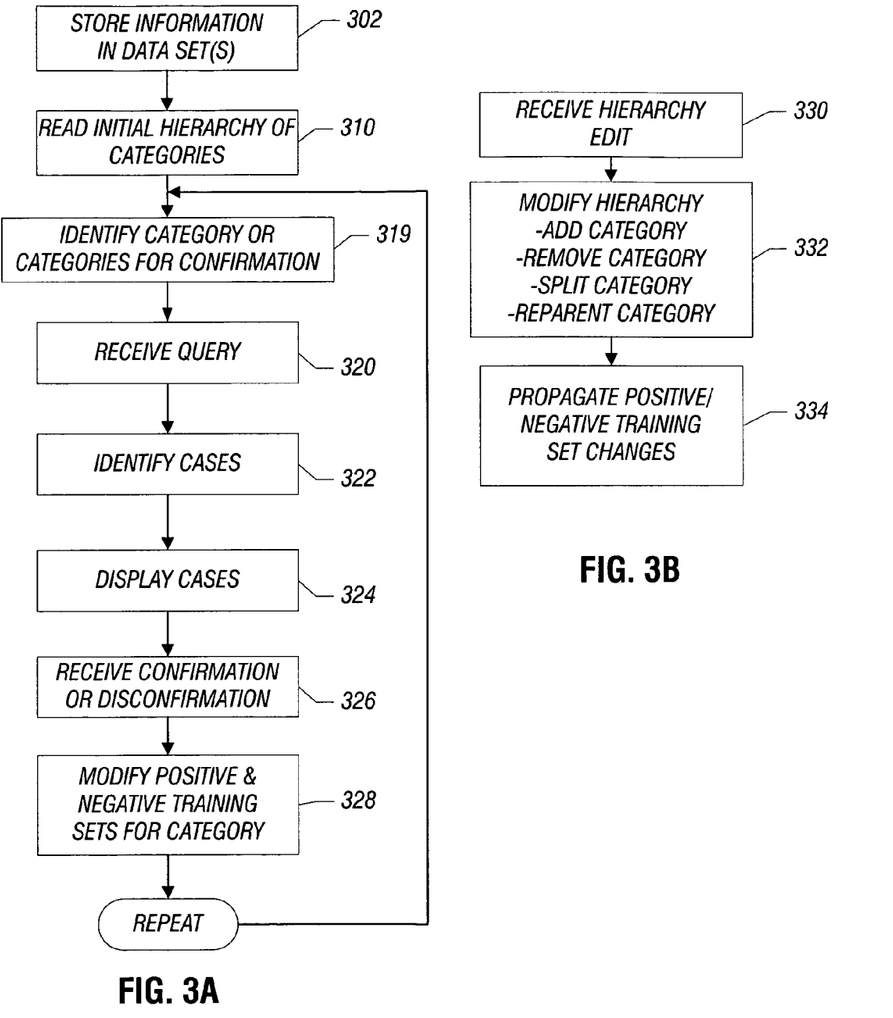
FIGS. 3A-3D are flow diagrams of processes performed by the tool according to an embodiment.

As shown in FIG. 3A, the process is performed by the modules of the tool 130 depicted in FIG. 1. The tool 130 stores (at 302) unlabeled cases 110 and labeled cases 111 (FIG. 1) in the storage 106 of the computer 100. The cases 110 and 111 are associated with information of various types, such as textual, numeric, chronological, monetary, pictorial, aural, and so forth. According to one implementation, at least some of the fields (or columns) of the information associated with the cases can be presented in a way that several cases can be summarized simultaneously in the display frame 216 (FIG. 2) of the GUI screen 200. Also, the information allows a user to recognize from the displayed information whether or not a particular displayed case belongs to a particular category. Note that in addition to information that are displayable in the display frame 216 to assist a user in confirming or disconfirming a category, the cases 110 also contain information that is useful to the categorizer 116 for categorizing cases.

The tool 130 can also read (at 310) an initial hierarchy of categories. One way of creating an initial hierarchy of categories is based on user input. In one scenario where training cases are to be developed for a new project, a set of categories may not yet exist. In this scenario, a user can create one or a few categories as the starting point. An expert may create the categories based on a preconceived notion of the relevant categories (such as problems) associated with a particular project. Alternatively, the expert may create the one or few categories based on prior experience or common knowledge of the expert. For example, it may be well known that a product has problems with battery life, wireless connectivity, and keys following off. In a second approach, an expert may "eyeball" cases by scooping random samples and seeing which problems jump out at the expert. A user or expert can add, delete, or modify categories using the category editor 126 (FIG. 1).

Alternatively, instead of relying on a human user or expert, an automated module in the tool 130, can be used to examine the unlabeled cases 110 and determine based on this examination one or plural possible categories. For example, one technique that can be used by such a module is a cluster-detecting technique to identify groupings of cases. These groupings of cases identified are reviewed by a user or expert to determine which categories are appropriate to add to an initial set of categories. Note that this initial set of categories provided (at 310) does not have to be highly accurate categories, nor do these categories have to survive the process of developing the categories. The initial set of categories merely provides a starting point.

In a different scenario, there may already be a set of extant categories that can be used as a starting point for further development of training cases.

After one or a few initial categories have been identified (at 319) for the purpose of searching and confirming, the scooping process can begin. To start the scooping process, a user enters a query relating to a category into the search area 214 of the GUI screen 200 (FIG. 2). A query relates to a category if the query contains search term(s) for finding cases that belong to the category. Note that a query relating to one category can also relate to other categories as well; in other words, in some scenarios, a query can contain search terms to find cases belonging to multiple categories. The query, received (at 320) by the search engine 102 (FIG. 1), can be in any of a number of formats, including a Boolean expression, a structured query language (SQL) query, or some other type of query. The search engine 102 can also have the capability of matching search terms specified by the query with related terms, such as synonyms. The related terms that are to be matched to the search term specified in the query can be grouped into a collection of terms. A case containing a term that matches any of the collection of terms is considered to be a match by the search engine 102.

In response to the query, the search engine 102 identifies (at 322) the matching set of cases and displays (at 324) the identified set of cases in the user interface 118 (FIG. 1). As depicted in the example GUI screen 200 of FIG. 2, the displayed summary of the matching cases includes numbers, dates, and short strings, with a single line per case, in a table. Alternatively, the identified cases may be displayed in two-dimensional or three-dimensional graphs, or in other formats. Optionally, a user can also access information in addition to the displayed information, such as by clicking on a link. Additionally, the displayed information includes the category (or categories) that a user (or the categorizer) has associated with the case (either based on an earlier training set or based on a prediction by the categorizer).

As noted above, the submission of the query, identification of cases matching the query, and the display of the cases is part of the scooping process. Typically, the scooping process has been performed with a hypothesis in the form of "cases that match this query should be training examples for category C."

After the cases have been displayed by the search engine 102, then the confirmation module 122 can receive (at 326) user confirmation or disconfirmation. For example, some of the cases may have been identified or inferred as being or not being in the category (or categories) in question. In the example of FIG. 2, some of the user-selectable boxes in column 220 of the display frame 116 can have been checked based on this previous identification or inference.

In an embodiment, the categorizer can determine whether a matching case should be indicated as belonging to a category by computing a confidence indication. The confidence indication is compared to a predefined threshold, and if the confidence indication is greater than the predefined threshold, the categorizer identifies the matching case as belonging to the category.

The user next goes through the displayed cases and either confirms or disconfirms by respectively checking the box (or leaving the box checked) or un-checking the box (or leaving the box un-checked) in the column 220. Note that a case can belong to more than one category, so that a scoop for one category may return cases that have already been labeled as belonging to another category. Note that check boxes constitute one example implementation for confirming or disconfirming that a case belongs to a category. There are numerous other techniques in other implementations, including techniques to check plural boxes at the same time.

For those cases that have been indicated as belong to the category in question (based on user selection of the box in column 220 in FIG. 2), the confirmation module 122 modifies (at 328) the positive training set by adding such cases to the positive training set for the category. For those cases that have been incorrectly matched, which are cases that the categorizer 116 initially identified as belonging to the category but which the user has disconfirmed as belonging to the category, the confirmation module 122 modifies (at 328) the negative training set by adding such cases to the negative training set for the category. Optionally, when the user disconfirms a case as belonging to a first category, the user can confirm that the case belongs to another category (although the user does not have to). The positive training set and negative training set are part of the training cases 112 in FIG. 1. Note that there can be plural positive training sets and plural negative training sets for respective categories. Steps 320-328 can be repeated for other categories or to further develop a current category.

As part of the process of confirming or disconfirming cases, the user may realize that a new category should be created. In the example depicted in FIG. 2, the user can do this using one of the menu items of the GUI screen 200, such as the "File," "Edit," or "Tools" menu items, or some other control element in the GUI screen 200.

As shown in FIG. 3B, the category editor 126 receives (at 330) an edit input (through the GUI screen 200) regarding a newly created category (or subcategory), a modified category (or subcategory), or a deleted category (or subcategory). In response to user input adding a new category (or subcategory), modifying a category (or subcategory), or deleting a category (or subcategory), the category editor 126 modifies (at 332) the hierarchy 124 of categories (FIG. 1). In the present discussion, it is noted that adding, deleting, or modifying a category refers to adding, deleting, or modifying a category and/or a subcategory. The user can also split a category into multiple categories or reparent a category (indicate one category as being a parent of another).

The modification of the hierarchy 124 of categories can result in changes of the positive and negative training sets, which changes are propagated (at 334).

Since any added or modified category is based on a user's examination of the summaries of cases listed in response to the query, the added or modified category is likely to be semantically meaningful (the label for the category or subcategory is descriptive of the corresponding problem or other event or item). Also, the set of categories created is not biased by any requirement that all cases have to be labeled or that all cases have to be assigned to a single category.

Figure 3C:
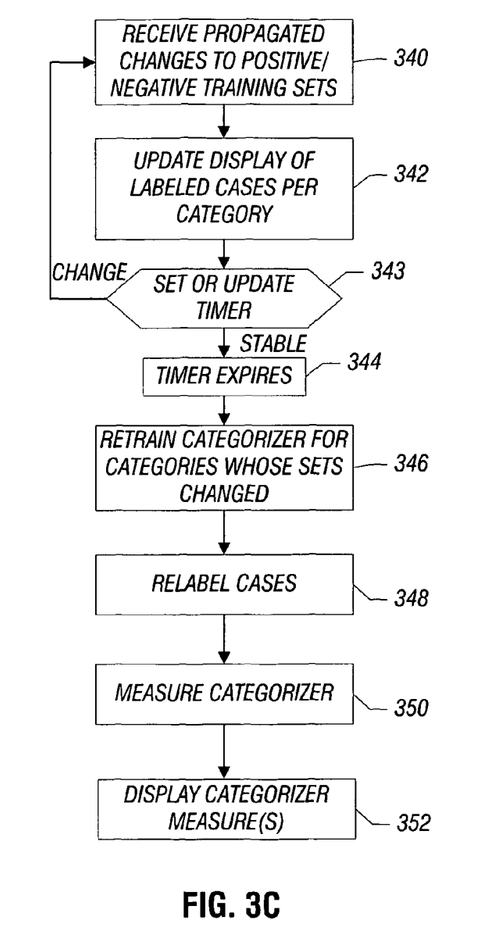

As discussed, as the user performs confirm/disconfirm and as categories or subcategories are added/modified/deleted, changes occur in the positive and negative training sets, which are propagated (at 340) through the hierarchy 124 of categories, as depicted in FIG. 3C. The display of cases per category is updated (at 342).

As the training cases 112 are being updated by the scooping and confirming processes described above, the categorizer 116 is retrained (at 346) in the background for categories whose positive or training sets have changed. Optionally, the retraining (at 346) can be delayed, by use of a timer involving optional steps 343 and 344. The timer is set or updated (at 343) to expire after a predetermined amount of time. Any change to the training cases will cause the process to loop back to step 340 (which will cause the timer to again be set or updated at 343). After some period of stability (a period during which no changes occur) has been detected, the timer expires (at 344), which allows the categorizer retraining (at 346) to be performed. Checking for stability at 344 avoids the situation where many successive changes in the positive and training sets in a short period of time caused by user confirming/disconfirming or category modification causes the retraining to restart many times. The retraining of the categorizer 116 can occur generally concurrently with the scooping and confirming processes so that the user can continue to perform the scooping and confirming processes even while the categorizer is being trained, subject to the training module 114 (optionally) waiting for expiration of the timer to ensure some period of stability. An output provided by the scooping process, confirming process, and training process described above is a categorizer, or plural categorizers.

The retrained categorizer is invoked to re-categorize or relabel (at 348) the cases 112. Also, the quality of categorization or labeling performed by the categorizer can be determined (at 350), and a measure of this quality can be displayed (at 352). The quality measures of a categorizer are listed above. Steps 340-352 can be repeated as changes to the positive and negative training sets are modified for various categories.

Figure 3D:
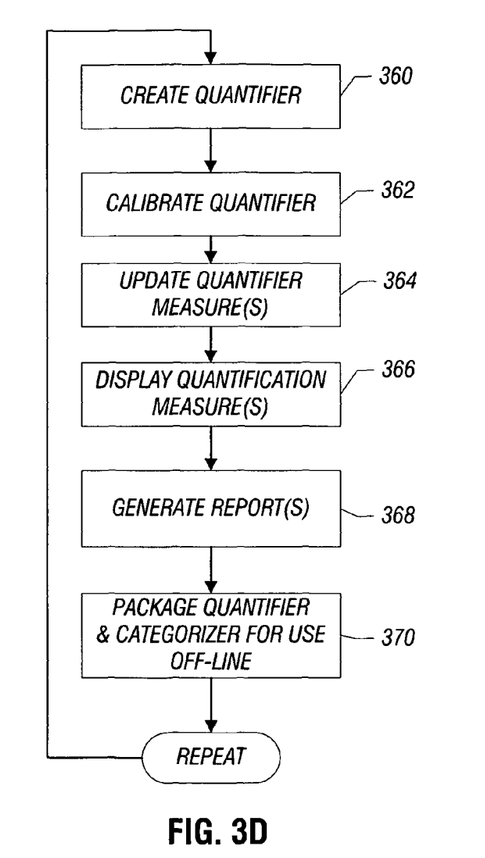

As depicted in FIG. 3D, at some point (which can be during or after the categorizer(s) has been trained and has been invoked to categorize cases in the one or more data sets 22), the quantifier 126 is created (at 360). The quantifier 126 can also be calibrated (at 362) to take into account any inaccuracies present in the categorizer 116. As noted above, a categorizer usually does not perform categorization of cases with perfect accuracy. An indication of quality of a categorizer that has been trained is provided by one or more of the quality measures listed above. In some embodiments, the quantifier 126 is calibrated based on the quality measures.

In one embodiment, to calibrate the quantifier 126 with respect to a category C, the analysis tool 16 determines the fraction (TPR) of the time that the categorizer is correct when presented with a case that should be categorized in a category C (also referred to as the true positive rate), and the fraction (FPR) of the time that the categorizer is wrong when presented with a case that should not be categorized in the category C (also referred to as the false positive rate). Assuming that a data set includes a total of T cases, of which N cases have been categorized in the category C, then the calibration to be performed by the calibrated quantifier 126 on the value N is as follows:

$$N'=(N-\text{FPR}\cdot T)/(\text{TPR}-\text{FPR}),$$

where N' is the calibrated N value.

Similar fractions representing true positive rates and false positive rates are also maintained for the other categories to enable calibration of the quantity values for other categories. This calibration technique for calibrating a quantifier/categorizer are described in U.S. patent application entitled "A Method of, and System for, Classification Count Adjustment," filed by George H. Forman et al., on Mar. 14, 2005. In other embodiments, any other technique of calibrating a quantifier or adjusting its output quantification, especially by observing the behavior of its underlying categorizer(s), may also be used.

When the quantification is an aggregate of a data field rather than a simple count of cases, the calibration adjustment may make use of the statistical distribution of values for the data field associated both with cases indicated by the categorizer to be in a given category and cases not indicated by the categorizer to be in the category. As one example, the quantification can be an estimate of the total time spent on calls (cases), and the categorizer identifies N calls as belonging to a category that have a sum of time spent of S. In this example, if the calibration adjusts the estimated count upwards to N' and the mean of the time spent on all calls (calls in the category and calls not in the category) is M, an adjusted aggregate may be $S+(N'-N)\cdot M$. Other, more sophisticated adjustments could also be used, for example those that focus on values associated with cases most likely to have been incorrectly categorized.

In yet another calibration technique, a score associated with each of a group of cases is obtained from the categorizer. A statistical distribution is computed based on the scores. The quantification measure is adjusted based on the statistical distribution.

The calibrated quantifier 126 is used to update (at 364) quantification measure(s) for each of the categories. The calibrated quantifier 126 produces calibrated quantification measure(s). The categorizer(s) 116 associated with the quantifier 126 provides information regarding the categorized cases to the quantifier 126 to enable the quantifier 126 to produce the quantification measure(s). Note that the quantification process can proceed concurrently with the search-and-confirm and the training processes discussed above. Thus, the system may present running estimate(s) of the quantification measure(s) in each category. The running estimate is updated as the categorizer 116 is further trained or as new cases arrive. The quantifier 126 displays (at 366) the updated quantification measures, such as estimated number of cases and quantity estimates (columns 208 and 210 in the frame 204 of FIG. 4).

The search, confirm, training, categorizing, and quantification processes described above proceed until all cases have been labeled (categorized). Alternatively, the processes can be terminated with some number of cases unlabeled (uncategorized), with the categories of the some number of cases predicted (either by the tool 130 or manually by a user).

The quantification measures can be presented in table format (such as in the GUI screen 200 of FIG. 2), pie chart format, bar chart format, or in any other format. The quantifier 126 can also request that the information be captured in an XML file, a spreadsheet, a text document (such as .PDF file or Word file), or in an interactive document (such as a web page) that allows customization, presentation, and/or the ability for a user to drill down to obtain greater detail regarding certain information.

The quantifier 126 is also able to generate one or more reports (at 368) regarding the quantification measures. The report(s) can provide comparisons of quantities of cases in a particular category for different data sets or in different parts of a single data set. To handle the latter, the tool 130 is able to partition the data set into multiple partitions based on information associated with the cases in the data sets. As examples, the "call date" field of each case may be partitioned by month or by day of the week, a numeric field may be partitioned based on separating its values into "small," "medium," or "large" segments, and a "part number" field may be partitioned based on product line. The information being compared can be presented side-by-side in the reports so that differences in the measures associated with the different data sets, or partitions of a single data set, are perceived by a user. The comparisons can take the form of side-by-side bar charts, graphs, or other output forms.

The reports can also list the top number of categories (such as a "top ten list") based on some factor, such as the number of cases in the category. Thus, for example, the tool 130 can provide a report listing the top ten categories, e.g., the ten categories with the greatest number of cases.

The quantifier 126 can be used off-line (on the computer 100 separate from the tool 130 or on another computer) for application to other data sets. For use off-line, the created quantifier 126, as calibrated, along with associated categorizer(s) 116, is packaged (at 370) into a separate software tool that can be invoked on the computer 100 or another computer.

As the quantifier 126 in the separate software tool is used with new data sets, the estimated quantification measure(s) made by the quantifier 126 on the new data sets, along with categorizations provided by the categorizer(s) 116, can be provided to an expert or other user. The expert or other user can then decide whether further calibration of the quantifier 126 and/or training of the categorizer(s) 116 associated with the quantifier 126 should be performed.

The categorizer(s) 116 associated with the quantifier 126 is also able to produce confidence indications that are output for the new data sets. As an example, the categorizer(s) 116 is able to report the number of cases for which the categorizer(s) 116 has a low level of confidence. As the number of low-confidence cases grow, then the categorizer(s) 116 is retrained since the hierarchy 124 of categories may no longer be sufficient. The tool 130 can then again be used in an interactive fashion with a user to retrain the categorizer(s) 116 and either create a new quantifier or modify the existing quantifier.

Steps 360-370 can be repeated to further develop quantification measure(s) for the current category or for another category.

Instructions of the various software modules described above are loaded for execution on corresponding processors. The processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
identifying, in response to a query relating to at least one category, plural cases from a set of cases;
receiving, by a system having a processor, indications corresponding to user confirmation or user disconfirmation of individual ones of the plural cases as belonging to the category, wherein user confirmation of a first of the plural cases as belonging to the category includes user selection of a first user-selectable element in a display screen, and wherein user disconfirmation of a second of the plural cases as belonging to the category includes user selection of a second user-selectable element in the display screen;
in response to the indications corresponding to the user confirmation of the first case and the user disconfirmation of the second case, adding, by the system, the first case to a positive training set, and the second case to a negative training set;
training, by the system, a categorizer based on the positive and negative training sets;
computing, by the system, a quantification measure associated with cases in the category based on output from the trained categorizer, wherein each of at least some of the cases in the category has a data field, and wherein computing the quantification measure comprises computing an aggregate of the data fields of the at least some of the cases in the category; and
adjusting, by the system, the quantification measure to calibrate for inaccuracy of the trained categorizer.

2. The method of claim 1, wherein computing the quantification measure comprises computing an estimated quantification measure.

3. The method of claim 1, wherein the category is part of a hierarchy of categories, the method further comprising:
in response to the query, displaying summaries of a subset of the cases from the set; and
receiving an input by a category editor to add at least one additional category to the hierarchy, the input based on the displayed summaries.

4. The method of claim 3, further comprising:
computing, based on output from the trained categorizer, at least another quantification measure for at least another category in the hierarchy.

5. The method of claim 4, further comprising listing the categories of the hierarchy in an order according to the quantification measures.

6. The method of claim 1, further comprising:
receiving an additional set of cases;
computing a quantification measure associated with the additional set of cases; and
repeating the receiving of the additional set of cases and computing the quantification measure associated with the additional set of cases at plural intervals.

7. The method of claim 6, wherein repeating the receiving and computing at the plural intervals comprises repeating the receiving and computing at intervals of less than one of: a year, a month, a week, a day, a minute, and a second.

8. The method of claim 1, wherein computing the aggregate comprises computing at least one of a sum, an average, a standard deviation, a percentage level confidence interval, a variance, a minimum, a maximum, a median, a mode, a geometric mean, a harmonic mean, a percentile rank, and an ordinal statistic.

9. The method of claim 1,
wherein adjusting the quantification measure is based on using a statistical distribution of values for the data fields associated both with cases indicated as being in the category by the categorizer and cases indicated as not being in the category by the categorizer.

10. The method of claim 1, wherein computing the quantification measure is performed by a quantifier, the method further comprising: calibrating the quantifier to adjust the quantification measure.

11. The method of claim 1, further comprising:
obtaining from the trained categorizer a score associated with each of a group of cases;
computing a statistical distribution based on the scores, wherein adjusting the quantification measure is based on the statistical distribution.

12. The method of claim 1, wherein the set of cases comprises a first set of cases, the method further comprising:
computing another quantification measure associated with cases in a second set that have been categorized by the categorizer as belonging to the category; and
generating a report presenting the quantification measure associated with the first set of cases and the quantification measure associated with the second set of cases.

13. The method of claim 1, wherein computing the quantification measure comprises computing the quantification measure with respect to cases of a first partition of the set, the method further comprising:
computing another quantification measure with respect to cases of a second partition of the set; and
generating a report that presents the quantification measures.

14. The method of claim 13, further comprising partitioning the cases of the set into the first partition and the second partition based on data fields associated with the cases.

15. The method of claim 1, further comprising creating a quantifier that is associated with the trained categorizer, the quantifier computing the quantification measure based on information from the trained categorizer.

16. The method of claim 15, further comprising using the quantifier and the trained categorizer to categorize and quantify cases for a second set of cases.

17. The method of claim 1, further comprising creating a quantifier that includes the trained categorizer, the quantifier computing the quantification measure based on information from the trained categorizer.

18. The method of claim 1, further comprising:
displaying the quantification measure as a running estimate; and
updating the running estimate based on further training of the categorizer.

19. A system comprising:
at least one processor;
a data set comprising cases;
a search engine to identify plural cases from the data set in response to a query relating to at least one category;
a confirmation module executable on the at least one processor to receive indications corresponding to user confirmation or user disconfirmation of individual ones of the plural cases as belonging to the category, wherein user confirmation of a first of the plural cases as belonging to the category includes user selection of a first user-selectable element in a display screen, and wherein user disconfirmation of a second of the plural cases as belonging to the category includes user selection of a second user-selectable element in the display screen, the confirmation module to further, in response to the indications corresponding to the user confirmation of the first case and the user disconfirmation of the second case, add the first case to a positive training set, and the second case to a negative training set;

a categorizer to be trained based on the positive training set and negative training set; and a quantifier to compute a quantification measure associated with cases in the category based on output from the trained categorizer, wherein each of the cases in the category has a data field, and the quantification measure is computed by aggregating the data fields of the cases in the category, and wherein the quantifier is to adjust, to calibrate for inaccuracy of the trained categorizer, the quantification measure based on a measure of accuracy of the trained categorizer.

20. The system of claim 19, wherein the search engine, the confirmation module, the categorizer, and the quantifier are executable concurrently to perform respective tasks.

21. The system of claim 19, wherein the categorizer is to classify the cases in the data set into the category.

22. The system of claim 21, wherein the categorizer is to provide information regarding the classification of the cases to the quantifier.

23. The system of claim 19, wherein the category is in a hierarchy of categories, and wherein the search engine is to cause display of summaries of a subset of the plural cases in response to the query, the system further comprising:

a category editor to add a new category to the hierarchy, in response to input based on the displayed summaries.

24. An article comprising at least one non-transitory storage medium containing instructions that when executed cause a system to:

identify, in response to a query relating to at least one category, plural cases from a set of cases;

receive indications corresponding to user confirmation or user disconfirmation of individual ones of the plural cases as belonging to the category, wherein user confirmation of a first of the plural cases as belonging to the category includes user selection of a first user-selectable element in a display screen, and wherein user disconfirmation of a second of the plural cases as belonging to the category includes user selection of a second user-selectable element in the display screen;

in response to the indications corresponding to the user confirmation of the first case and the user disconfirmation of the second case, adding the first case to a positive training set, and the second case to a negative training set;

train a categorizer based on the positive and negative training sets;

compute a quantification measure associated with cases in the category based on output from the trained categorizer, wherein each of the cases in the category has a data field, and wherein computing the quantification measure comprises computing an aggregate of the data fields of the cases in the category; and adjust, to calibrate for inaccuracy of the trained categorizer, the quantification measure based on a measure of accuracy of the trained categorizer.

* * * * *